(12) United States Patent
Palberg et al.

(10) Patent No.: US 11,014,789 B2
(45) Date of Patent: May 25, 2021

(54) CONSTRUCTION MACHINE

(71) Applicant: Liebherr-Components Biberach GmbH, Biberach an der Riss (DE)

(72) Inventors: Michael Palberg, Riedlingen (DE); Juergen Resch, Degernau (DE); Oliver Fenker, Warthausen (DE)

(73) Assignee: LIEBHERR-COMPONENTS BIBERACH GMBH, Biberach an der Riss (DE)

( * ) Notice: Subject to any disclaimer, the term of this patent is extended or adjusted under 35 U.S.C. 154(b) by 304 days.

(21) Appl. No.: 16/092,086

(22) PCT Filed: Apr. 7, 2017

(86) PCT No.: PCT/EP2017/000459
§ 371 (c)(1),
(2) Date: Feb. 14, 2019

(87) PCT Pub. No.: WO2017/174204
PCT Pub. Date: Oct. 12, 2017

(65) Prior Publication Data
US 2019/0177131 A1    Jun. 13, 2019

(30) Foreign Application Priority Data

Apr. 8, 2016 (DE) ...................... 20 2016 002 296.3

(51) Int. Cl.
*B66C 13/08* (2006.01)
*B66C 13/40* (2006.01)
(Continued)

(52) U.S. Cl.
CPC ............ *B66C 13/085* (2013.01); *B66C 13/30* (2013.01); *B66C 13/40* (2013.01); *B66C 13/46* (2013.01); *G05B 19/0423* (2013.01)

(58) Field of Classification Search
CPC ....... B66C 13/085; B66C 13/30; B66C 13/46; B66C 13/40; G05B 19/0423
See application file for complete search history.

(56) References Cited

U.S. PATENT DOCUMENTS

| | | | | |
|---|---|---|---|---|
| 5,196,900 A | * | 3/1993 | Pettersen | G01C 11/02 356/141.4 |
| 5,227,985 A | * | 7/1993 | DeMenthon | G01S 5/163 345/158 |

(Continued)

FOREIGN PATENT DOCUMENTS

| | | |
|---|---|---|
| CN | 101948082 A | 1/2011 |
| CN | 102515026 A | 6/2012 |

(Continued)

OTHER PUBLICATIONS

State Intellectual Property Office of the People's Republic of China, Office Action and Search Report Issued in Application No. 201780022336.X, dated Oct. 30, 2019, 18 pages. (Submitted with Partial Translation).

(Continued)

*Primary Examiner* — Marthe Y Marc-Coleman
(74) *Attorney, Agent, or Firm* — McCoy Russell LLP

(57) ABSTRACT

A construction machine, in particular in the form of a crane, cable excavator or similar, comprising an electronic control device for controlling and/or detecting operating parameters, in addition to at least one drive device for moving a functional element, especially a load take-up means. The functional element of the construction machine is guided in the desired direction by the exertion of manipulation forces on the functional element, or on a component fastened thereto, or the functional element is moved manually in a designated direction, this motion then being assisted by the drives of the construction machine. If the functional element is manually pressed or pulled in a designated direction (Continued)

and/or rotated, or if this is at least attempted, these motion attempts are detected and converted into a corresponding positioning motion of the construction machine.

22 Claims, 5 Drawing Sheets

(51) Int. Cl.
*B66C 13/30* (2006.01)
*B66C 13/46* (2006.01)
*G05B 19/042* (2006.01)

(56) References Cited

U.S. PATENT DOCUMENTS

| | | | |
|---|---|---|---|
| 8,281,811 B2 | 10/2012 | Rau | |
| 8,660,759 B2 | 2/2014 | Hashimoto et al. | |
| 9,279,679 B2* | 3/2016 | Kumagai | G01S 3/784 |
| 9,582,079 B2 | 2/2017 | Bock-Krausen et al. | |
| 2002/0152079 A1* | 10/2002 | Furuta | E02F 9/26 704/275 |
| 2003/0057408 A1 | 3/2003 | Kazerooni et al. | |
| 2012/0283896 A1 | 11/2012 | Persaud et al. | |
| 2017/0111723 A1* | 4/2017 | Boesen | G06F 21/32 |

FOREIGN PATENT DOCUMENTS

| | | | |
|---|---|---|---|
| CN | 103101838 A | 5/2013 | |
| DE | 1315005 A1 | 11/1994 | |
| DE | 4315005 A1 * | 11/1994 | ............... G01D 5/26 |
| DE | 19825312 A1 | 3/1999 | |
| DE | 102007012575 A1 | 9/2008 | |
| DE | 112009001162 T5 | 4/2011 | |
| DE | 102011002952 A1 * | 7/2012 | ............. B66C 13/40 |
| DE | 102011002952 A1 | 7/2012 | |
| DE | 102012110190 A1 | 4/2014 | |
| DE | 102013209279 A1 | 11/2014 | |
| DE | 202013011913 U1 | 11/2014 | |
| JP | S5495442 A | 7/1979 | |
| WO | 0232804 A2 | 4/2002 | |
| WO | 03095352 A1 | 11/2003 | |

OTHER PUBLICATIONS

ISA European Patent Office, International Search Report Issued in Application No. PCT/EP2017/000459, dated Nov. 13, 2017, WIPO, 5 pages.

* cited by examiner

CONSTRUCTION MACHINE

CROSS-REFERENCE TO RELATED APPLICATION

The present application is a U.S. National Phase of International Patent Application Serial No. PCT/EP2017/000459, entitled "CONSTRUCTION MACHINE," filed on Apr. 7, 2017. International Patent Application Serial No. PCT/EP2017/000459 claims priority to German Utility Model Application No. 20 2016 002 296.3, filed on Apr. 8, 2016. The entire contents of each of the abovementioned applications are hereby incorporated by reference in their entirety for all purposes.

TECHNICAL FIELD

The present invention relates to a construction machine, in particular in the form of a crane, of a cable-operated excavator, and the like, having an electronic control apparatus for controlling and/or detecting operating parameters and having at least one drive device for moving a functional element, in particular a load suspension means.

BACKGROUND AND SUMMARY

Electronically controlled construction machinery typically has a control processor that can control various functions elements such as a lifting hook, tools, or adjustment members, drives, or monitoring devices and/or is connected to sensors, monitoring apparatus, or other detection means to detect and store specific operating parameters. In this respect, control programs specified by the control processor can be worked through and/or control commands that can be input by a machine operator can be carried out that the control processor uses to control the corresponding adjustment members or drives or implements in a corresponding data processing.

To be able to input control commands or, conversely, to be able to display monitored operating parameters, the control apparatus of the construction machine here typically comprises a control keypad, adjustment levers such as joysticks, command switches, a touchscreen, or other, optionally externally connectable input means, and a display apparatus, for example in the form of a screen or a different data output device that can be connected to said control processor and can be provided either directly at the control station or can also be attached to a remote control.

In addition to input and output devices that are attached as stationary and that allow an operation at the control station itself, it has already been proposed to use a mobile end device that is configured in the manner of a tablet, of a remote control unit, or of a cellular phone and that can wirelessly communicate with the control processor of the control apparatus. Such a mobile end device facilitates the operation and monitoring of the construction machine. There have nevertheless occasionally been some adverse effects in handling on the use of such mobile end devices. For example, the machine operator can leave the end device at the control station when descending so that monitoring reports output by the end device are not perceived or are only made known to the machine operator with a time delay. On the other hand, it can be difficult to simultaneously actuate or read the end device and to carry out other work, for example a machine operation or machine handling to be carried out with both hands such as the lashing of the lifting hook or the movement of a concrete skip.

Starting from this, it is the underlying object of the present invention to provide an improved construction machine of the named type which reduces disadvantages of the prior art and further develops the latter in an advantageous manner. A control and monitoring of the machine that is simple to handle and that has high operating comfort should in particular be achieved that distracts the machine operator as little as possible from other responsibilities such as the observation of the functional element and the like.

Said object is achieved in accordance with the invention by a construction machine directing the functional element of the construction machine in the desired direction in that manipulation forces are manually exerted on the functional element or on a component fastened thereto or in that the functional element is manually moved in a specific direction, which is then assisted by the drives of the construction machine. If the functional element is pushed or pulled and/or rotated manually in a specific direction or if this is at least attempted, these movement attempts are detected and are converted into a corresponding adjustment movement of the construction machine. In accordance with the invention, a detection device is provided for detecting manually carried out manipulation forces and/or manipulation movements that are exerted on the functional element and/or that are carried out at the functional element, with the control apparatus of the construction machine being configured to control the at least one drive device to move the functional element in dependence on the detected manipulation force and/or manipulation movement.

Said detection device is in particular also configured here to detect the direction of the manually carried out manipulation forces and/or manipulation movements such that the control apparatus can control said drive device such that the functional element is moved in the corresponding direction and the direction of movement initiated by the drive device at least substantially corresponds to the direction of the manual manipulation attempt.

Alternatively or additionally, said detection device can also be configured to detect the strength or magnitude of the manually carried out manipulation force and/or manipulation movement by amount, with the control apparatus being able to adapt the speed and/or the acceleration and/or the adjustment path of the drive movement of the functional element generated by a motor thereto. If, for example, the lifting hook of a crane or a component fastened thereto is pushed or pulled and/or rotated more or further in one direction, the control apparatus can carry out a corresponding drive movement to travel the lifting hook faster or further away from the adjustment path. Conversely, a finer manual manipulation can be converted into a finer, smaller motorized manipulation.

Such a conversion of a manual manipulation attempt of the functional element of the construction machine or of a component received thereby into a corresponding motorized manipulation of the functional element allows a particularly simple, intuitive directing of the construction machine and of its functional element and gives the machine operator the feeling of being able to push, pull and/or rotate the functional element of the construction machine and any component that may be received therein effortlessly and without energy in the desired direction even though the components typically to be processed or moved by construction machinery have a high weight.

The manual manipulation force and/or manipulation movement detected by the detection device does/do not have to be directly exerted on the functional element or on a component received thereby here, but provision can rather also be made that the detection device detects a manipulation movement carried out at the functional element, for example a hand movement in the sense of a waving up or down and interpreted as a control command that is then converted by the control apparatus of the construction machine into a corresponding adjustment movement of the drive device. Such a configuration of the detection device permits a gesture control of the construction machine and of its functional element, as will be explained in more detail below.

Said detection device can in this respect generally be formed in different manners. If, for example, the construction machine is configured as a crane or as a cable-operated excavator or if the functional element is suspended in an oscillating manner—such as the lifting hook of a crane at its hoist rope or the gripper of a cable-operated excavator at its cable—the detection device can have, in a further development of the invention, determination means for determining a deflection of the functional element suspended in an oscillating manner with respect to a vertical line that can pass through the suspension point of the oscillating suspension. The control apparatus can here advantageously be configured to control the at least one drive device in dependence on the detected deflection, in particular such that the adjustment movement of a construction machine element initiated by the drive device attempts to compensate the detected deflection. If, for example, an oblique pull of the hoist rope or of the lifting hook fastened thereto is detected in a crane, said oblique pull, for example, passing away from the crane tower to the front in the direction of the boom, the control apparatus can travel the trolley further to the front at the boom to compensate the oblique pull. If, for example, an oblique pull of the lifting hook transversely to a vertical plane through the boom is detected, the control device can actuate the slewing gear of the crane to again rotate the boom vertically above the lifting hook.

Said determination of deflections of the functional element suspended in an oscillating manner can here be effected in various manners, for example in that an inclinometer is associated with the hoist rope. Advantageously, the determination means for determining the deflection with respect to the vertical can also comprise at least one imaging sensor, in particular a camera, whose direction of view can advantageously pass perpendicularly downwardly and at least approximately coaxially to a vertical line through the suspension point so that deflections of the functional element suspended in an oscillating manner have the result that the pictorial representation of the functional element, for example of the lifting hook of a crane, migrates out of the image center. The image provided by the imaging sensor or camera can be evaluated by means of an image evaluation device with respect to the eccentricity of the image element that reproduces the functional element or a marking associated therewith from which the control device can then generate a corresponding control command for the at least one drive direction.

In the above-named manner, the direction of the deflection and/or the amount of the deflection can be taken into account here to adapt the direction and/or acceleration and/or amount or degree of the adjustment movement caused by a motor.

Alternatively or additionally to such a determination of the deflection of the functional element caused by manual manipulation forces and/or manipulation movements, the aforesaid detection device can also have a control module that can be docked to the functional element of the construction machine and/or to a component received thereat and that can have at least one operating element for inputting control commands in dependence on which the functional element is then traveled by the control device.

To enable an intuitive operation, said at least one operating element of the travel control module can have axes of movement that coincide with the travel axes of the functional element of the construction machine or at least approximately correspond thereto. A movement of the operating element in a specific direction can in particular effect a traveling of the construction machine or of its functional element in the corresponding direction and/or a rotation of the operating element about an axis of rotation can be converted in a corresponding direction into a rotation of the functional element about an axis of rotation in parallel therewith.

The operating element of the control module that can be docked or fixedly installed at the functional element can be a joystick, for example, that is tiltable in different axes to generate travel movements in the corresponding directions and/or is rotatable to enable a rotation of the component such as has previously been described. Alternatively or additionally, slide buttons and/or push buttons and/or a touchscreen on which finger movements in specific directions or rotations can be detected can be used as the operating element; they can, for example be attached to the lifting hook or provided on a control module dockable thereto.

This travel control module or its at least one operating element is advantageously not provided in the machine operator's cab—where corresponding travel control means can naturally also be provided—but rather in direct proximity to the functional element of the construction machine to be traveled, for example directly at the lifting hook or at the deflection pulley of a crane supporting the lifting hook. For example, respective push buttons can be provided at its four sides at the lifting hook or at a structural part connected thereto that trigger a travel movement in the direction of the push movement on their pushing, whereby an intuitive fine adjustment of the alignment or position of the lifting hook is made possible. Alternatively or additionally, a rotational control button can be provided which is rotatable about an upright axis and by means of which the lifting hook or the trolley can be rotated about the upright axis by means of a suitable rotation apparatus to be able to set a desired direction angle.

Alternatively or additionally to such a fine adjustment position control module directly at the load receiving means or at the component fastened thereto, said travel control module can also be implemented in the form of a mobile control unit, for example in the form of a tablet or of a joystick unit and/or of a combination thereof, that a machine operator present at the functional element to be directed can take along with him. The orientation of the control axes defined at the tablet or at the joystick can be very simply brought into agreement with the movement axes of the construction machine, for example, in that the machine operator himself or the tablet or joystick unit moves into a predefined orientation with the construction machine, for example moves with his back to the crane tower beneath its boom and/or the tablet moves in a specific orientation to the boom of the crane and/or he or the tablet moves in a specific orientation with the structure that is to be erected and whose orientation is naturally known to the structure data model.

Alternatively or additionally, the control module can also be attached to the component to be moved whose position and orientation are ultimately to be controlled, for example by magnetic fastening means, suction cups, latching holders, or similar. For example, a corresponding control tablet or a joystick unit can be positioned for fine adjustment at a marked installation point at the component to be able to carry out the fine adjustment or fine positioning in the named manner.

By an attachment that is, for example, temporary of the travel control module to the component to be adjusted and/or to the load receiving means receiving the component in a predefined orientation thereto, which can take place, for example, by a holder at the component and/or load receiving means and/or a mark attached thereto, it is simultaneously possible to link the orientation axes of the operating element of the travel control module in a suitable manner with the movement axes of the construction machine since the temporary attachment in a predefined orientation defines the movement axes of the operating element and enables an intuitive operation. If, for example, a tablet or a joystick unit or similar is positioned in a predefined orientation at a main surface of a finished wall, the crane control, for example, recognizes the alignment of the wall by means of a suitable sensor system so that the pressing of right/left/up/down arrows or a corresponding swiping movement on the tablet or a movement of the joystick can be converted into an adjustment movement of the crane in the desired direction. On attachment to the functional part itself, for example to a predefined main side of a lifting hook or of the lifting hook pulley, the control of the crane knows the orientation of the travel control module since the lifting hook orientation is known in accordance with its intended purpose.

Alternatively or additionally, a destination point to be traveled to by the functional element of the construction machine can also be marked by means of a laser pointer. The control apparatus of the construction machine or its detection apparatus can have a suitable detection means, in particular an optical detection means, for this purpose for detecting the laser light dot generated by the laser pointer, with said detection device advantageously being configured such that the position of the laser light dot and/or its spatial coordinates can be determined, and indeed advantageously in a three-dimensional coordinate system. The position of the laser light dot can in particular be identified in a coordinate system related to the construction machine, for example by means of an imaging sensor system that can be installed at the crane. The control apparatus can then control the construction machine in dependence on the laser detected light dot and on its position such that its functional element travels to the laser light dot.

In an advantageous further development of the invention, said travel control module can wirelessly communicate with the control apparatus of the construction machine for the fine positioning of the respective received load, with a radio transmission of the control signals being able to be provided, for example. Alternatively, however, a signal cable transmission of the control signals can also take place, for example via the hoist rope to which the lifting hook of a crane is fastened.

Provision can be made in accordance with another aspect of the present invention to configure the at least one mobile electronic module of the control apparatus as a so-called "wearable" module that is attached to the human body and is worn without having to be held by a hand. The mobile electronic module can here have input means for inputting control commands to a control processor of the control apparatus and can be integrated in a functional part that is to be worn in accordance with its intended purpose at the body of the machine operator and that has fastening means matched in shape to the human body for fastening to a limb. The functional part forms a wearable part that the machine operator wears at one of his limbs, whereby the electronic module is automatically worn on the body. The electronic module is wearable at the machine operator's body without his active action or holding, without impairing the freedom of movement of the hands, arms, and legs of the machine operator so that the machine operator admittedly permanently wears the electronic module of the control apparatus at his body, but simultaneously has his hands, arms and legs free to perform other handling work such as the lashing of a lifting hook, the directing of a concrete skip during concreting, or other work. The machine operator can here input control commands via the wearable part worn at the body to the control processor of the control apparatus of the construction machine without the machine operator first having to look for the matching control lever at the machine operator's station. Alternatively or additionally, the electronic module can also display information relating to the operation of the machine to the machine operator. Both are in particular helpful when the machine operator turns away from the cockpit in the control station, for example, and its control levers are no longer in front of him or he has turned away from the functional element thereat and allow a fast reaction in critical situations.

The functional part to be worn at the body in accordance with its intended purpose and into which said electronic module is integrated can here perform or satisfy further functions independently of the function of the electronic module and can in particular protect or cover the body of the machine operator or can keep it warm or envelope it.

Said mobile electronic module can in particular be integrated into an article of clothing such as a jacket or a pair of pants. The electronic module can, for example, be woven, sewn, or fastened in an article of clothing or can be permanently fastened thereto in a different manner so that the article of clothing worn by the machine operator wears the electronic module and takes it along with him.

The mobile electronic module of the control apparatus can optionally be integrated in a glove.

The integration of the mobile electronic module in a glove allows control commands to be input to the control processor in a variety of manners. The input means for inputting such control commands can, for example, comprise at least one piezo sensor that can be integrated in the glove to be able to generate a control command by pressing and/or bending and/or pulling the piezo element, for example by making a first and/or by spreading the fingers wearing the glove and/or by pressing together two fingertips with which the piezo element is associated. It can, for example also be detected by means of such a piezo sensor when the hand of the machine operator wearing the glove suddenly firmly presses a control knob, for example in the form of a joystick, from which a conclusion can be drawn that a hazardous situation is present on the basis of which then corresponding control reactions can be initiated, for example the braking of an adjustment movement of the construction machine.

As previously explained with respect to the variant of the tablet, the direction of a pushing command or movement command of the glove can here be detected or determined, for example, in that the glove is placed at a predefined point of the component, for example at a front side of the finished wall to be moved whose orientation the construction machinery control apparatus is aware of or detects by means of a suitable sensor system, for example by means of a camera looking downward from the crane boom. If the control apparatus is aware of the orientation of the component or of the load receiving means at which the glove is placed, the control apparatus is also aware of the alignment of the glove.

Alternatively or additionally, it would, however, also be possible to detect the orientation of the glove by means of a suitable sensor system, for example by means of gyroscope sensors and/or compass elements and/or inclinometers and/or GPS modules, etc. to associate specific pressing signals of the sensors integrated in the glove in specific movement directions with the adjustment movement to be produced.

Such a glove can also comprise a plurality of sensors, for example pressure sensors, with which different movement directions and/or control functions are associated so that, for example, a different travel movement can be initiated by pressing the sensor attached to an index finger than by the pressing of a palm sensor.

Alternatively or additionally to such a piezo element, the input means for inputting control commands can also comprise an accelerometer and/or an orientation sensor by means of which movements of the limb wearing the electronic module can be detected. Hand movements can in particular be detected when said accelerometer and/or orientation sensor is integrated in a glove. A gesture control can in particular be implemented by means of such an accelerometer and/or orientation sensor. If specific limb movements are detected whose acceleration and/or speed reach or exceed a specific amount and/or whose direction is in a specific spatial direction, corresponding control commands can be transmitted to the control processor of the construction machine.

The electronic module can here in particular be configured such that there is a correlation between the directions of the limb movements and corresponding adjustment movements of a piece of working equipment, in particular such that, for example, an upwardly directed movement of the electronic module is converted into an upwardly directed movement of the functional element, in particular of the lifting hook or of the excavator tool, and/or a downwardly directed movement of the electronic module is converted into a downwardly directed movement of the functional element.

If, for example on an integration of said electronic module in a glove, the hand is abruptly moved upward so that an acceleration and/or speed in an approximately vertical direction reaches a specific amount, the lifting hook of a crane can, for example, be raised. Conversely, downwardly moving hand movements that have a corresponding downward speed and/or acceleration, can be converted into a lowering of the piece of working equipment.

Even if the previously described input means in the form of a piezo element, of an accelerometer and/or of an alignment sensor and/or of a positional sensor have been described in connection with a glove, these input means can also be associated with or integrated in other articles of clothing or other accessory parts wearable on the body.

Alternatively or additionally, specific hand movements can also be detected in a different manner, for example by an optical detection device that could, for example, be attached in the cockpit or in the control station of the construction machine and that could be directed to the hands of the machine operator typically resting on the steering wheel or on the main control levers.

Alternatively or additionally, such an optical detection device for detecting hand movements of other limb movements can also be provided at the functional element to be directed or at the travel control module dockable thereat to enable the gesture control of the said kind not only in the cockpit of the operator's station, but also directly at the functional element to be directed.

Said optical detection device and/or an image evaluation device of the gesture control apparatus disposed downstream thereof can here advantageously be configured to detect and/or to recognize predefined hand signals and/or limb signals that can, for example, accompany a specific body posture and/or can correspond to specific orientations of the hands and/or arms and/or legs.

Alternatively or additionally, the/a mobile electronic module can also be integrated in a shoe or in a head covering such as a helmet or a cap.

Alternatively or additionally to such an electronic module integrated in an article of clothing, a mobile electronic module can also be provided that is integrated in an accessory part or functional part of personal use wearable on the body, in particular in a watch or a pair of eyeglasses.

Said electronic module can, for example, be integrated in a smart watch that can communicate with the control apparatus of the construction machine via said electronic module, can in particular communicate control commands to a control processor and/or can display control data coming from the control processor. An image of the environment of the construction machine can in particular also be shown on the display of such a smart watch that is, for example, provided by a trolley camera, a camera drone, or another imaging sensor system.

Alternatively or additionally to such a smart watch, a projection armband can also be used that can project relevant information directly onto the lower arm and/or that can detect user input, for example, fingertip movements in the projected image, in the manner of a touchscreen with the aid a special sensor system.

Alternatively or additionally, the electronic module can be integrated in smart glasses that the machine operator wears on his nose or in front of his eyes, with control data being able to be displayed on the smart glasses. The smart glasses can for this purpose, for example, have a head up display that projects information onto at least one lens and/or can have a transparent screen lens on which, for example, information can be presented in accordance with the liquid crystal principle. At the same time, said smart glasses can also satisfy a function supporting the visual function; they can, for example, comprise ground optical lenses.

Alternatively or additionally to such smart glasses, contact lenses configured as a head up display can also be used that can display relevant information directly in front of the eye.

Alternatively or additionally, the mobile electronic module can be integrated in an acoustic head set that can comprise loudspeakers positionable at the ear and/or a microphone positionable close to the mouth to be able to acoustically output control information and/or operating information and/or to be able to acoustically input control commands. The acoustically input control commands can be detected by means of a voice recognition device and can be converted into corresponding control commands. Since a limited number of control commands are sufficient for the directing of the functional element of a specific construction machine, for example of the lifting hook of a crane, for example in the form of "Hookup"; "Hook down", "Hook forward", "Hook back", "Hook left", "Hook right", a voice recognition device can also work reasonably in an acoustically unfavorable environment such as a construction site having a number of secondary noises.

Said "wearable" module can generally have different properties depending on the functionality of the control apparatus of the construction machine. Said module can advantageously comprise optical and/or acoustic and/or tactile display means, for example in the form of a display and/or of a buzzer and/or of a loudspeaker and/or of a vibrating element.

If, for example, electronic modules integrated in a shoe and/or a glove are provided, messages can be reported by vibrating the shoe and/or by vibrating the glove and/or can be additionally shown on a display. Alternatively or additionally, an acoustic message can be output.

Alternatively or additionally, messages can be shown on the display of the smart watch or on the smart glasses, with additional acoustic and/or tactile messages also being able to be output here.

In an advantageous further development of the invention, provision can be made here that wearables or electronic modules wearable on different limbs can display different control data or different information so that the machine operator intuitively realizes which control function is displayed. A first operating parameter such as an impending exceeding of the permitted payload of a crane can, for example, be indicated by vibrating the shoes and a second operating parameter such as a traveling to a work range boundary can be indicated by a vibrating of a glove, and a third operating parameter such as the reaching of a desired position of a concrete skip for the concreting can be indicated by a buzzing of the smart watch. Respective separate electronic modules and/or display modes at different articles of clothing and/or at different limbs can advantageously be associated with different operating parameters and/or different machine functions.

Alternatively or additionally, different display modes of the same electronic module can be associated with different operating parameters and/or different control functions of the construction machine. An overload can, for example, be indicated by a vibration of the gloves and the reaching of a working range boundary can be indicated by the lighting up of LEDs at the glove. Said different display signals can here also be indicated at different electronic modules and/or at different sections of the functional clothing, for example the aforesaid overload by vibrating the shoes and the reaching of a working range boundary by a lighting up of the gloves.

The at least one electronic module can generally have different input means for inputting control commands. A touchscreen can, for example, be provided that can generate input signals by touch, with such a touchscreen advantageously being able to input a menu control and/or a keypad in the manner of a keyboard to be able to input written commands. Alternatively or additionally, push buttons or adjustment switches can be provided as input means, for example in the form of sliding switches, press buttons, or rocker switches, for example in the form of push buttons on a smart watch.

Alternatively or additionally, a piezo element can also be integrated as an input means in the functional part wearable on the body, for example in the form of a piezo membrane that is sewn, or woven into a section of an article of clothing or is integrated in another manner. For example, such a piezo element can be integrated in the region of a finger of a fingered glove so that a corresponding adjustment signal can be input by kinking the finger and thus deforming the piezo element.

Alternatively or additionally, such a piezo element can, for example, be integrated in the sole of a shoe so that, for example, an adjustment signal can be generated by a powerful stamping on the ground.

The invention will be explained in more detail in the following with respect to a preferred embodiment and to an associated drawing.

Figure 1:
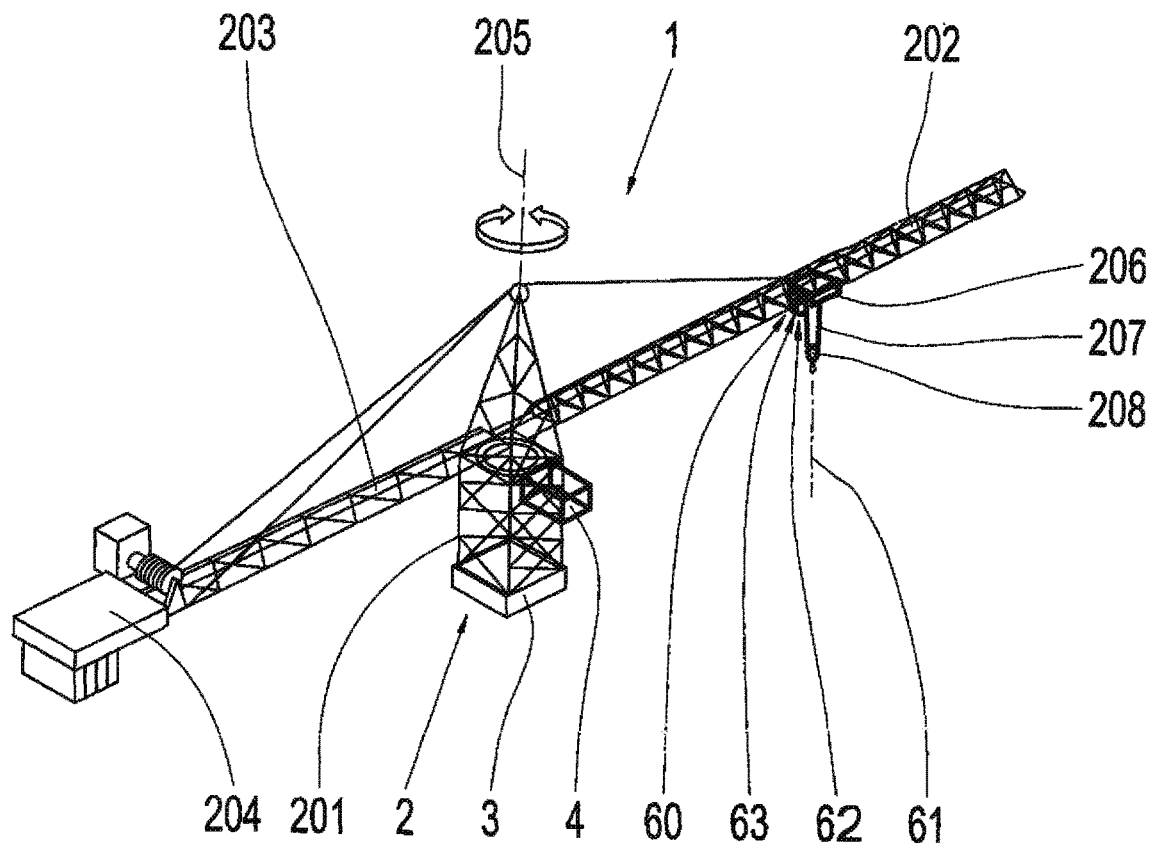
FIG. 1 shows a schematic representation of a construction machine in the form of a revolving tower crane whose lifting hook forms a functional element of the construction machine.

As FIG. 1 shows, the construction machine 2 can be configured as a crane, for example as a revolving tower crane, a harbor crane, or as an offshore crane. The revolving tower crane shown in FIG. 1 can, for example, have a tower 201 in a manner known per se that carries a boom 202 that is balanced by a counter-boom 203 at which a counter-weight 204 is provided. Said boom 202 can be rotated by a slewing gear together with the counter-boom 203 about an upright axis of rotation 205 that can be coaxial to the tower axis. A trolley 206 can be traveled at the boom 202 by a trolley drive, with a hoist rope 207 to which a lifting hook 208 is fastened runs off from the trolley 206.

DETAILED DESCRIPTION

As FIG. 1 likewise shows, the construction machinery 2 can here have an electronic control apparatus 3 that can, for example, comprise a control processor arranged at the construction machine itself. Said control apparatus 3 can here control different adjustment members, hydraulic circuits, electric motors, drive apparatus, and other pieces of working equipment at the respective construction machine. In the crane shown, they can, for example, be its lifting mechanism, its slewing gear, its trolley drive, its boom/luffing drive—where present—or the like.

Said electronic control apparatus 3 can here communicate with an end device 4 that can be arranged at the control station or in the operator's cab and can, for example, have the form of a tablet with a touchscreen and/or joysticks so that, on the one hand, different information can be displayed by the control processor 3 at the end device 4 and conversely control commands can be input via the end device 4 into the control apparatus 3.

Figure 9:
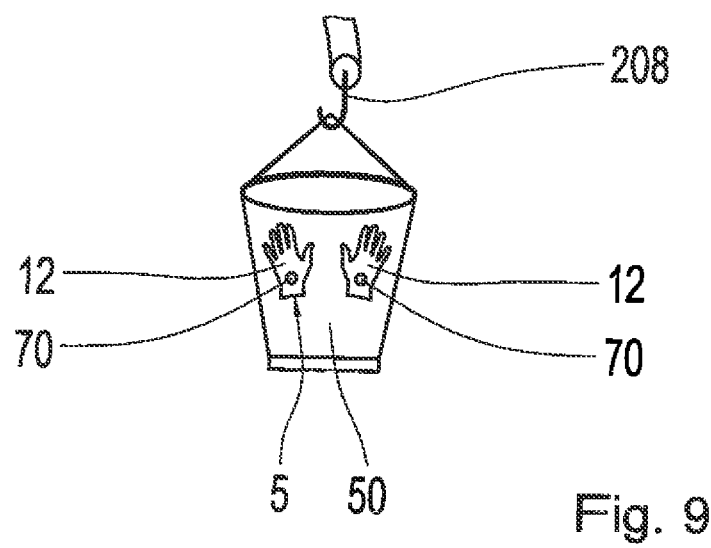
FIG. 9 shows a schematic representation of the manual directing of a concrete skip received at the lifting hook of the crane of FIG. 1 by means of gloves in which sensors are integrated.

Said control apparatus 3 of the crane 1 can in particular be configured to control said drive apparatus of the lifting gear, of the trolley, and of the slewing gear even when the lifting hook 208 and/or a component such as the concrete skip 50 shown, for example, in FIG. 9 received thereat is manually manipulated by a machine operator, i.e. is pushed or pulled and/or rotated in one direction or if this is attempted to enable a manual fine direction of the lifting hook—and thus of the concrete skip position, for example on concreting.

For this purpose, the crane 1 can have a detection device 60 that detects an oblique pull of the hoist rope 207 and/or deflections of the lifting hook 208 with respect to a vertical line 61 that passes through the suspension point of the lifting hook 208, i.e. the trolley 206.

The determination means 62 of the detection device 60 provided for this purpose can, for example, work optically to determine said deflection. A camera 63 or another imaging sensor system can in particular be attached to the trolley 206 that looks perpendicularly downwardly from the trolley 206 so that, with a non-deflected lifting hook 208, its image reproduction is at the center of the image provided by the camera 63. If, however, the lifting hook 208 is deflected with respect to the vertical line 61, for example by a manual pushing or pulling at the lifting hook 208 or at the concrete skip 50 shown in FIG. 9, the image reproduction of the lifting hook 208 moves out of the center of the camera image, which can be determined by an image evaluation device 64.

Depending on the detected deflection with respect to the vertical line 61, in particular while taking account of the direction and magnitude of the deflection, the control apparatus 3 can control the slewing gear drive and the trolley drive to bring the trolley 206 more or less exactly above the lifting hook 208 again, i.e. the control apparatus 3 controls the drive apparatus of the crane 1 such that the oblique pull or the detected deflection is compensated as much as possible. An intuitive simple directing and fine setting of the position of the lifting hook and of a load received thereat can hereby be achieved.

Figure 2:
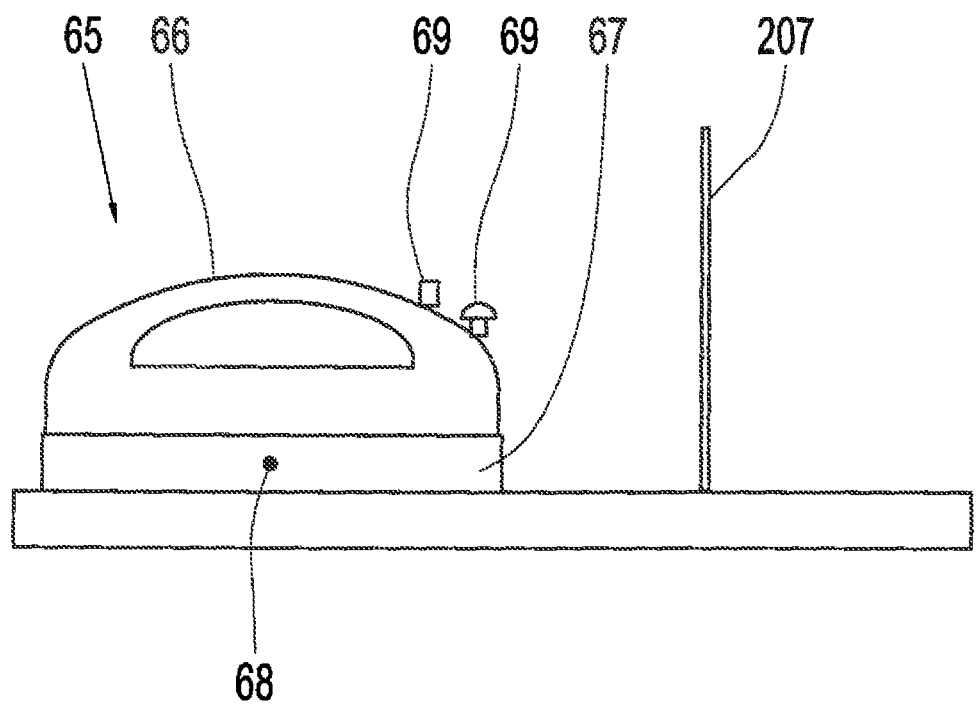
FIG. 2 shows a schematic representation of a travel control module that can be docked to the lifting hook of the crane of FIG. 1 to be directed or to a component received therein.

Alternatively or additionally, said detection device 60 can also comprise a travel control module 65 that is configured as mobile and that can be configured as dockable at the lifting hook 208 and/or at a load lashed thereto. As FIG. 2 shows, such a travel control module 65 can, for example, comprise a handle 66 that can be releasably fastened via suitable holding means 67 to the load receiving means 208 and/or to a component connected thereto in an articulated manner such as the concrete skip 50 of FIG. 9. Said holding means 67 can, for example, comprise magnetic holders, suction cups, latching holders, bayonet socket holders, or similar.

Force and/or torque sensors 68 and optionally, with a possible movable support or design of the handle 66, also motion sensors can be associated with said handle 66 by means of which forces and/or torques and/or movements exerted on the handle 66 can be detected. The sensor system associated with the handle 66 is here advantageously configured such that the forces and/or torques and/or movements can be detected with respect to their effective direction and/or their magnitude by amount.

The control apparatus 3 can control the drive devices of the crane 1 using the manipulation forces and/or manipulation torques and/or manipulation movements that are exerted on the handle 66 and that are detected by the detection device 60 such that the detected manual manipulations are converted into motorized crane adjustment movements, as was explained in more detail in the introduction.

Alternatively or additionally to said handle 66, the travel control module 65 can also comprise other operating elements 69, for example a tiltable and/or rotatable joystick, a touchscreen on which swiping movements and/or the pressing of displayed movement symbols such as arrows and the like are detected and/or sliding switches and/or push buttons and/or rocker levers and similar. As initially explained, the actuation axes of the at least one operating element 69 are linked to the movement axes of the crane 1 to enable an intuitive operation of the crane, for example such that upwardly directed manual operating movements travel the crane hook upwardly, manipulation actions directed to the left travel the crane hook to the left, etc.

If the travel control module 65 is releasably docked to the crane hook 208 and/or to the component attached thereto, it can be ensured by the configuration of the docking means or of the aforesaid holding means 67 and/or by predefining a docking position, for example by corresponding markings, that the travel control module 65 is docked in the correct orientation.

Figure 10:
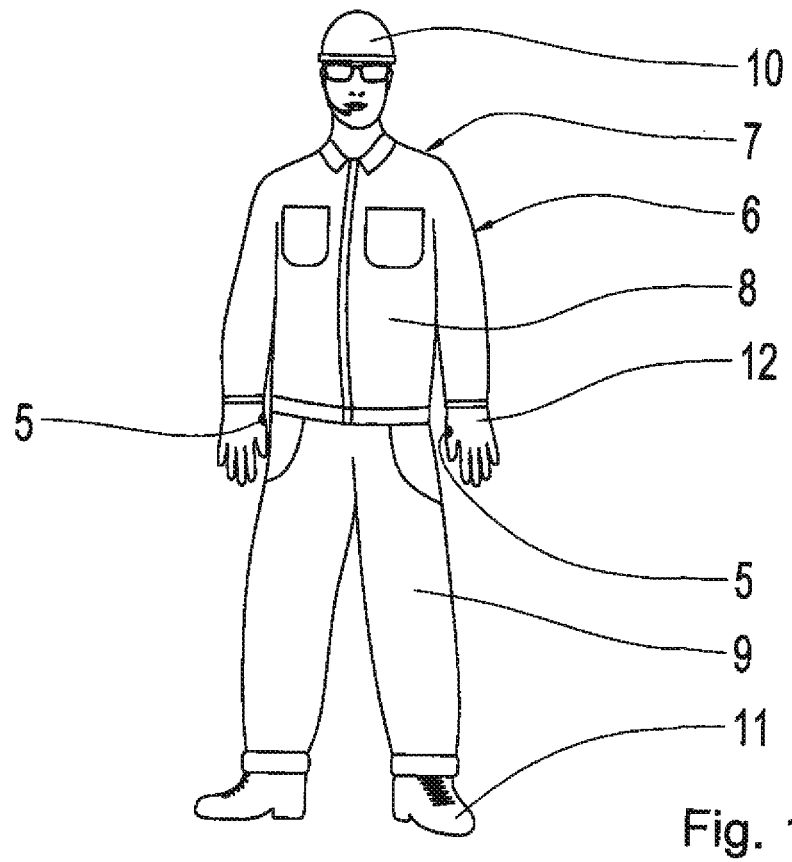
FIG. 10 shows a schematic representation of different electronic modules in the form of wearables by means of which different options of the crane of FIG. 1 can be controlled and/or monitored.

To be able to control and/or monitor at least one operating parameter of the construction machine, said control apparatus 3 can furthermore comprise mobile electronic modules 5 in the form of so-called wearables that are integrated in functional parts or wearable parts or clothing parts that are worn on the body in accordance with their intended purpose and are held on their own on the body in accordance with their intended purpose without any active holding or balancing. Said functional parts can here be an article of clothing 7 such as a jacket 8 or a pair of pants 9 that are matched in shape to the body and that remain on the body in a self-supporting manner by their shape matching, cf. FIG. 10. In a manner known per se, aids such as belts, suspenders, zippers, and the like can be used.

Alternatively or additionally, the parts of clothing in which an electronic module 5 is integrated can also comprise a head covering 10 such as a headband, a cap, or a helmet and/or can also have shoes 11, optionally also in the form of boots, and/or gloves 12.

As FIG. 9 shows, such gloves 12 having electronic modules 5 integrated therein can, for example, be used in a similar manner as described above to direct or finely adjust the position of the lifting hook 208 of the crane 1 or of a concrete skip 50 fastened thereto. Such gloves 12 can, for example, comprise pressure-sensitive and/or direction-sensitive sensors 70 that can be integrated in fingertips and/or in the palm of the respective glove 12.

If surfaces of the component to be traveled and/or of the load receiving means are touched by the gloves 12, the direction in which the gloves 12 push, pull or rotate at the component or load receiving means can be detected by means of said sensors 70 to then carry out corresponding travel movements via the control apparatus 3 of the crane 1. Position markings can here, for example, be attached to the component to be traveled that predefine the contact or gripping position of the gloves 12 so that the control apparatus 3 is aware—from the component alignment at the crane hook 208—of the direction in which the gloves 12 and their sensors 70 work.

Alternatively or additionally, different functions can also be associated with the different sensors 70 of the gloves 12, for example such that the function "Horizontal travel from right to left" is associated with a palm sensor of the right glove whereas the function "Vertical travel" is associated with the palm sensor of the left glove. To be able to control a travel perpendicular to the contact plane—that is perpendicular to the plane of the drawing of FIG. 9—the finger sensor of the left glove can, for example, signal an approach to the operator and a finger sensor of the right glove can signal a traveling away. Other assignments of the sensors are naturally possible.

Alternatively or additionally, the gloves 12 can also have accelerometers and/or gyroscope elements by means of which hand movements and their directions can be detected. A gesture control is hereby made possible, for example such that an upward waving by the glove is converted into a raising of the lifting hook.

To implement such a gesture control, the aforesaid detection device 60 can also have a camera or an imaging sensor system or another optical detection device by means of which hand movements or other limb movements of a machine operator can in particular be detected directly in the proximity of the lifting hook 208. Such a camera can be arranged at a different position, for example at the tower 201 and/or at the boom 202 and/or at the lifting hook 208 and/or at an aerial drone and/or at the previously named travel control module 65 that can be docked to the component to be directed. An image processing can evaluate the detected movements of the machine operator from which the control apparatus 3 can give travel commands to the crane 1. The image evaluation device can here in particular be configured such that the hand signs defined in DIN 33409 can be detected or can be determined in the image provided by the camera. Such hand signs defined in said DIN standard include, for example, the raising of the right arm to indicate that hand signs will subsequently be given or the laterally horizontal extending of both arms that is interpreted as a stop signal for stopping the crane movements and/or for ending a movement routine or a slight waving up and down of the palm with a horizontally extended lower arm to indicate the initiation of a slow downward movement.

Figure 7:
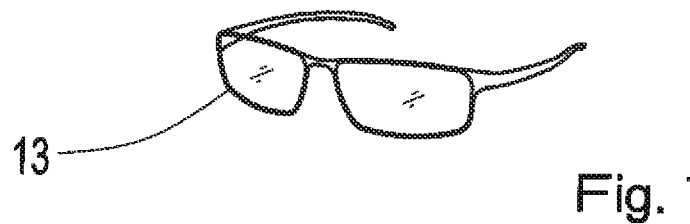
FIG. 7 shows a schematic representation of a mobile electronic module in the form of smart glasses linked to the control apparatus of the crane.

Alternatively or additionally to such articles of clothing, an electronic module can also be integrated in a personal accessory that is worn on the body in accordance with its intended purpose and that can satisfy an ornamental function and/or further additional functions such as a vision aid and the like. As FIG. 3 or FIG. 7 shows, such a personal accessory can be a pair of smart glasses 13, a watch 14, a finger ring, a bracelet, or a belt and the like in which an electronic module 5 is integrated for controlling and/or monitoring the construction machine 2.

Figure 3:
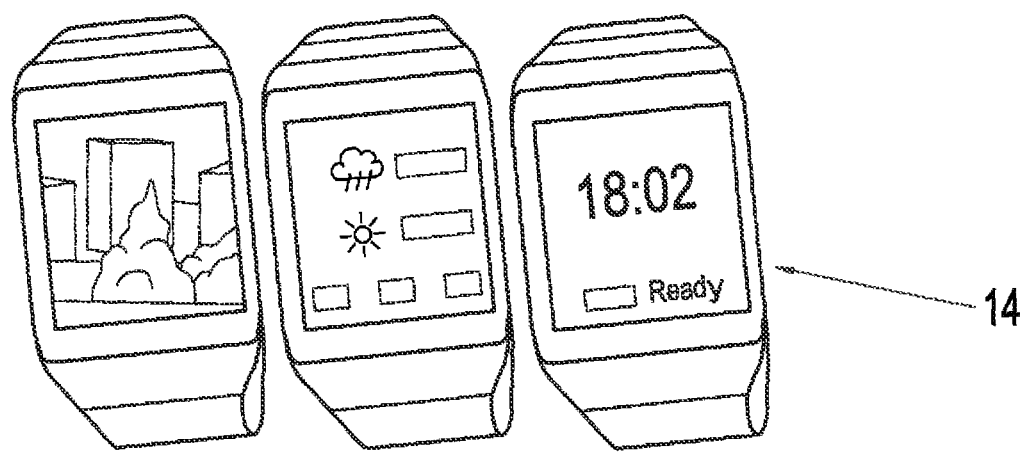
FIG. 3 shows a schematic representation of a mobile electronic module in the form of a smart watch linked to the control apparatus of the crane.

FIG. 3 here shows a watch 14 in the form of a smart watch that has a display on which different information relating to the construction machine operation can be displayed. Said smart watches can optionally also have a touchscreen by means of which control commands can be input to the control apparatus of the construction machine.

Figure 4:
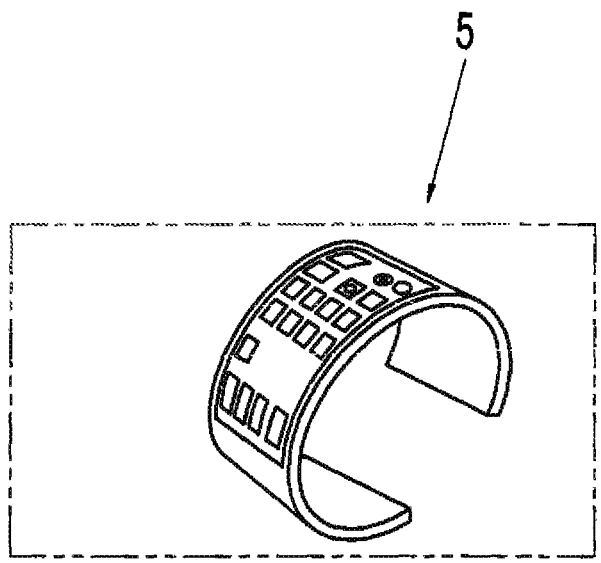
FIG. 4 shows a schematic representation of a mobile electronic module in the form of a tablet attached to the wrist linked to the control apparatus of the crane.

As FIG. 4 shows, the mobile electronic module 5 can also be a tablet that can be fastened to a wrist by means of a wristband-like or bangle-like holding device and that can here also itself have a curved display that can otherwise, however, work in the manner of a conventional tablet, that is, can also generate control commands by means of a touchscreen function.

Figure 5:
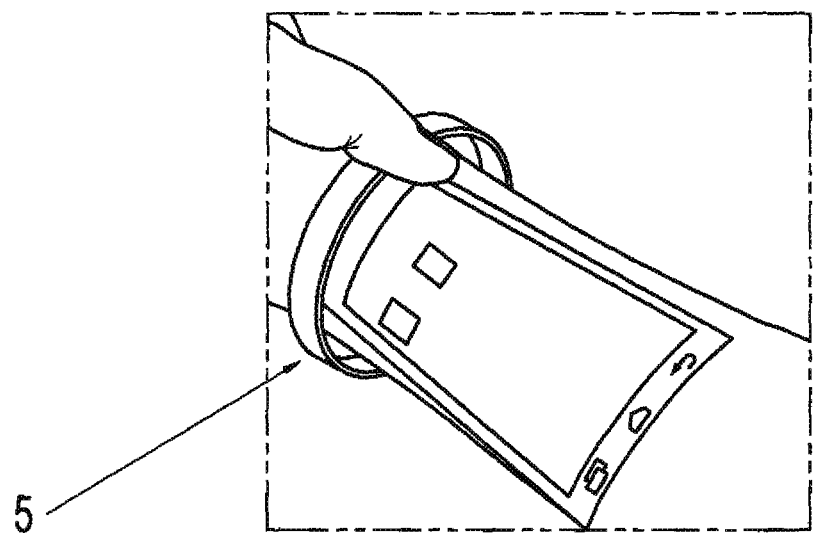
FIG. 5 shows a schematic representation of a mobile electronic module in the form of a projection wristband that can project an image onto the lower arm and that is linked to the control apparatus of the crane.

FIG. 5 shows a mobile electronic module 5 in the form of a projection wristband that can project an image onto a lower arm. A detection function can also be provided here that can detect a fingertip or similar in the region of the projected image to input control commands.

Figure 6:
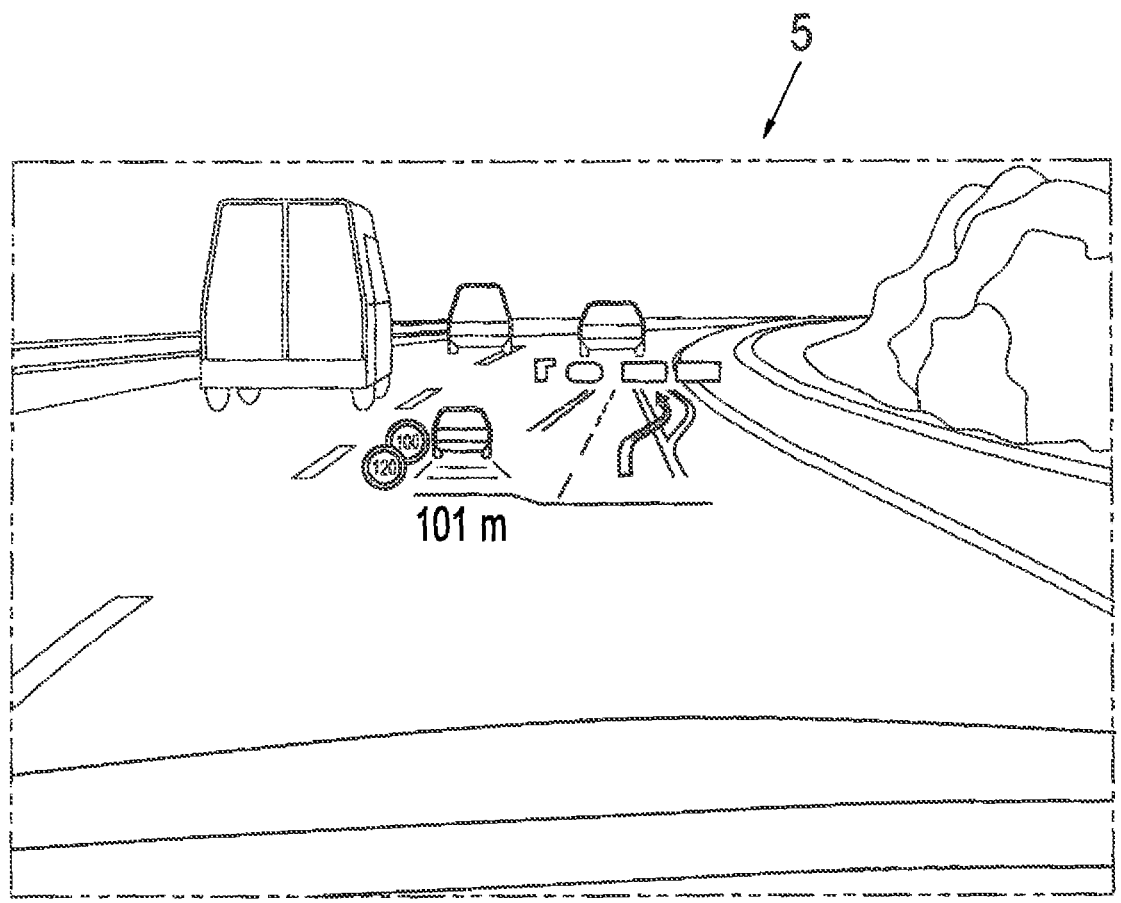
FIG. 6 shows a schematic representation of a mobile electronic module in the form of a head up display linked to the control apparatus of the crane.

As FIG. 6 shows, the smart glasses 13 that are shown in FIG. 7 can, for example, also work in the manner of a head up display in which supplementary information can be overlaid into a transparent panel or into a lens or into a transparent plastic body, whereby an augmented reality can be generated.

Figure 8:
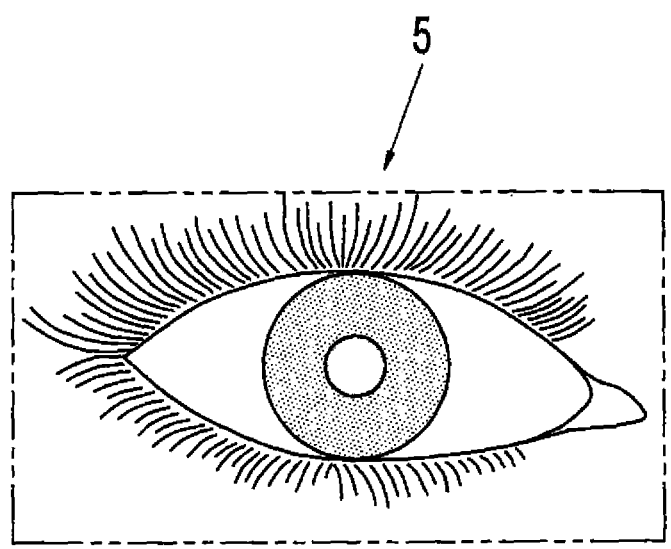
FIG. 8 shows a schematic representation of a mobile electronic module in the form of a contact lens configured as a head up display linked to the control apparatus of the crane.

As FIG. 8 shows, such a mobile electronic module 5 that is configured and works in the manner of a head up display can also be configured as a contact lens.

As previously explained, said electronic modules 5 can here be associated with different operating parameters and/or control functions of a construction machine 2 so that different operating parameters can be monitored and/or controlled at different limbs. For example, the lifting mechanism of the crane can be controlled and/or monitored by an electronic module 5 in the right glove 12, whereas, for example, the trolley of the crane 2 can be controlled or monitored by an electronic module 5 in the left glove.

The electronic modules 5 configured as mobile and/or in the form of wearables can advantageously wirelessly communicate with the respective construction machine 2. This can take place, for example, via Bluetooth, with here the control apparatus 3 being able to have a Bluetooth adapter at the lifting hook pulley of the construction machine 2 via which the respective electronic module 5 can be linked to the control apparatus 3. In an analog manner, the respective electronic module 5 likewise comprises a Bluetooth transmission and/or reception device.

The data communication between the electronic modules 5 and the control processor 3 of the construction machine 2 is here advantageously bidirectional so that both monitored operating parameters can be displayed at the electronic module 5 and control commands can be input at the electronic module 5.

The electronic modules 5 can here have input means configured in the initially described manner for inputting control commands and can have display means for displaying control data and/or monitored operating parameters such as likewise initially described.

The invention claimed is:

1. A construction machine, comprising: in particular a crane,
    an electronic control apparatus for controlling and/or detecting operating parameters and having at least one drive device for moving a functional element, and
    a detection device for detecting manually carried out manipulation forces and/or manual movements that are exerted on the functional element and/or that are carried out at the functional element, wherein the electronic control apparatus being configured to control the at least one drive device in dependence on a detected manipulation force and/or manipulation movement,
    wherein the detection device comprises:
        a travel control module mounted at the functional element of the construction machine and/or at a load attached to the functional element, and
        at least one operating element for inputting control commands which control travel of the functional element.

2. The construction machine in accordance with claim 1, wherein the functional element is suspended in an oscillating manner and is a load receiving means of a crane fastened to a hoist rope, or is an excavator tool of a cable-controlled excavator, wherein the detection device has determination means for determining a deflection of the functional element suspended in an oscillating manner with respect to a vertical line through a suspension point; and wherein the control apparatus is configured to control the at least one drive device in dependence on a detected deflection.

3. The construction machine in accordance with claim 1, wherein a detections means comprises an imaging sensor whose axis of view passes perpendicularly downwardly through a suspension point and an image evaluation device for determining a oblique pull and/or a deflection of the functional element with respect to a vertical line through the suspension point.

4. The construction machine in accordance with claim 1, wherein a actuation axis of the at least one operating element coincides with a travel axis of the functional element of the construction machine.

5. The construction machine in accordance with claim 1, wherein the operating element of the travel control module has at least one force and/or torque and/or distance sensor for detecting at least one of: force, a torque, and an adjustment path of a handle of the travel control module.

6. The construction machine in accordance with claim 1, wherein the travel control module has a tiltable and/or rotatable joystick as the operating element.

7. The construction machine in accordance with claim 1, wherein the detection device has a gesture detecting apparatus for detecting gestures and for generating control commands in dependence on a detected gestures, with said gesture detection apparatus comprising an imaging sensor and an image evaluation device arranged downstream.

8. The construction machine in accordance with claim 1, wherein the detection device has a voice recognition device for recognizing spoken control commands, with the control apparatus being configured to convert detected voice commands into control commands for the at least one drive device.

9. The construction machine in accordance with claim 1, wherein the detection device has an optical detection means for detecting a laser light dot that can be emitted by a laser pointer and that marks a destination point for traveling of the functional element, with the control apparatus being configured to control the at least one drive device in dependence on the detected laser light dot.

10. The construction machine in accordance with claim 1, wherein the control apparatus comprises at least one mobile electronic module that includes at least one accelerometer, with the control apparatus being configured to control the at least one drive device in dependence on an acceleration of the at least one mobile electronic module detected by a accelerometer, with the at least one mobile electronic module being formed as portable in a hand and/or at a limb.

11. The construction machine in accordance with claim 1, wherein at least one electronic module is integrated in smart glasses.

12. The construction machine in accordance with claim 1, wherein at least one electronic module is integrated in a wristwatch.

13. The construction machine in accordance with claim 1, wherein at least one electronic module is integrated in a projection wristband.

14. The construction machine in accordance with claim 1, wherein at least one electronic module is integrated in a tablet that can be worn at the wrist by means of a wristband and/or a bangle.

15. The construction machine in accordance with claim 1, wherein at least one electronic module comprises a head up display.

16. The construction machine in accordance with claim 1, wherein a head up display is associated with smart glasses and/or with a contact lens.

17. The construction machine in accordance with claim 1, wherein at least one electronic module has display for displaying control data and/or operating parameters, with the display comprising an at least one of: optical display device, an acoustic display device, and a vibration display device, and the one electronic module comprising a piezo element integrated in an article of clothing.

18. A crane comprising:
an electronic control apparatus for controlling operating parameters;
at least one drive device for moving a functional element;
a detection device for detecting inputs, wherein the control apparatus controls the at least one drive device in dependence on the detected inputs,
wherein the control apparatus comprises a wearable which has a mobile electronic module for displaying and/or for inputting control data, the wearable shaped to fit in a self-supporting manner on a limb of a machine operator, and a piezo integrated into the mobile electronic module.

19. The construction machine in accordance with claim 18, wherein the mobile electronic module is integrated in an article of clothing.

20. The construction machine in accordance with claim 18, wherein the at least one electronic module comprises an accelerometer and/or a spatial angle sensor and are configured to generate control commands in dependence on specific accelerations in a specific spatial orientation of a gesture control.

21. A crane comprising:
an electronic control apparatus for controlling operating parameters, the control apparatus comprising a first wearable and a second wearable for receiving control inputs, and the two wearables integrated into clothing shaped to fit on each of opposing limbs;
at least one drive device for moving a functional element;
a detection device for detecting inputs, wherein the control apparatus controls the at least one drive device in dependence on the detected inputs;
a lifting/lowering module for generating a control command for lifting the functional element on a detection of an upwardly directed movement of a accelerometer on the first wearable and lowering the functional element on a detection of a downwardly directed movement of the accelerometer of the first wearable; and
a horizontal control module controlling movement of the functional element based on inputs received at the second wearable.

22. The construction machine in accordance with claim 21, wherein electronic modules associated with different operating parameters and/or different control functions are integrated in different functional parts at different limbs of a machine operator such that a first operating parameter and/or a first control function can be monitored and/or controlled at a first limb and a second operating parameter and/or a second control function can be monitored and/or controlled at a second limb.

\* \* \* \* \*